March 22, 1927.
T. J. FETCHER
1,621,773
CONTROLLING DEVICE FOR MOTOR DRAWN BINDERS
Filed July 29, 1921      3 Sheets-Sheet 1
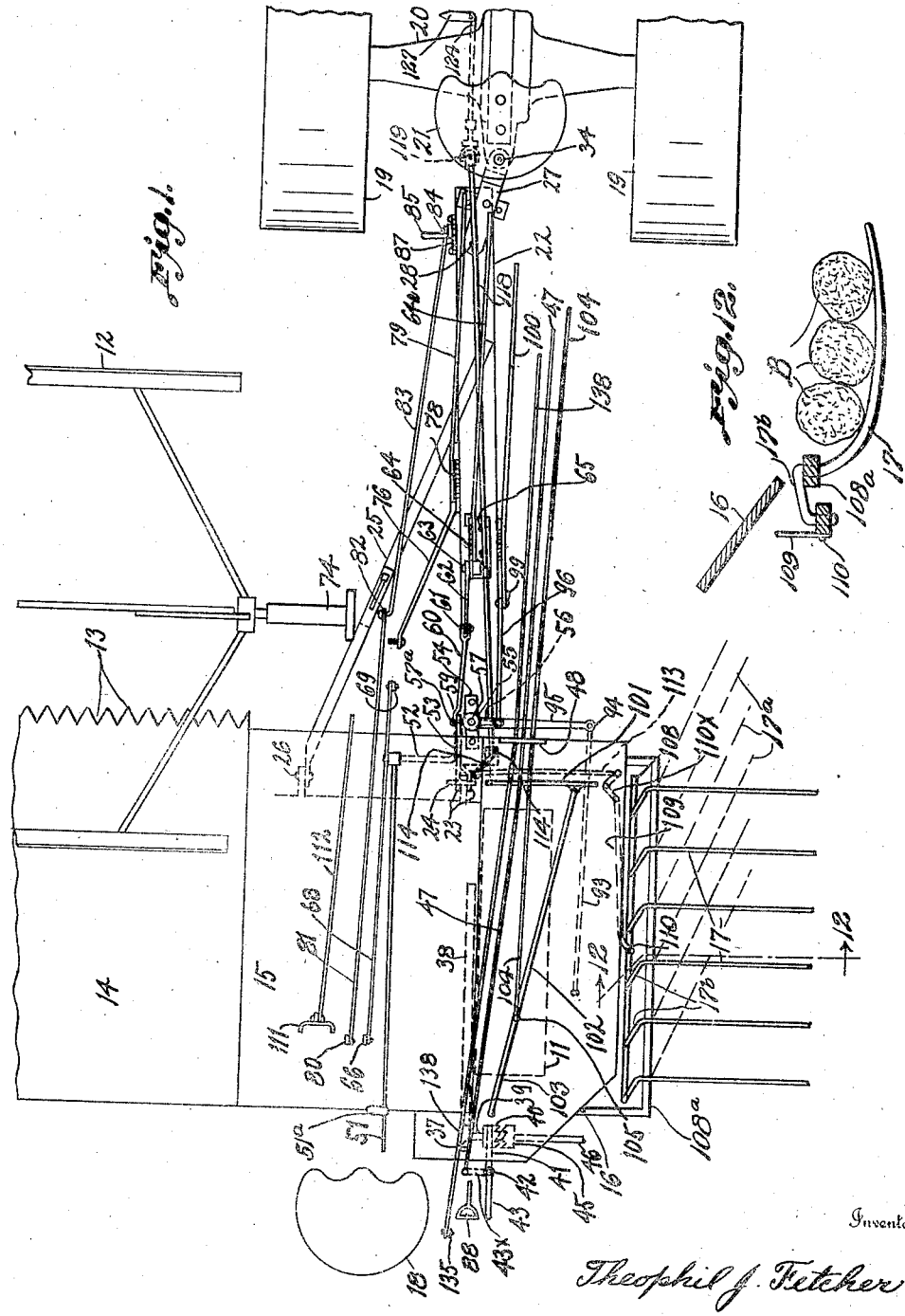
Inventor
Theophil J. Fetcher
By A. M. Carlsen
Attorney

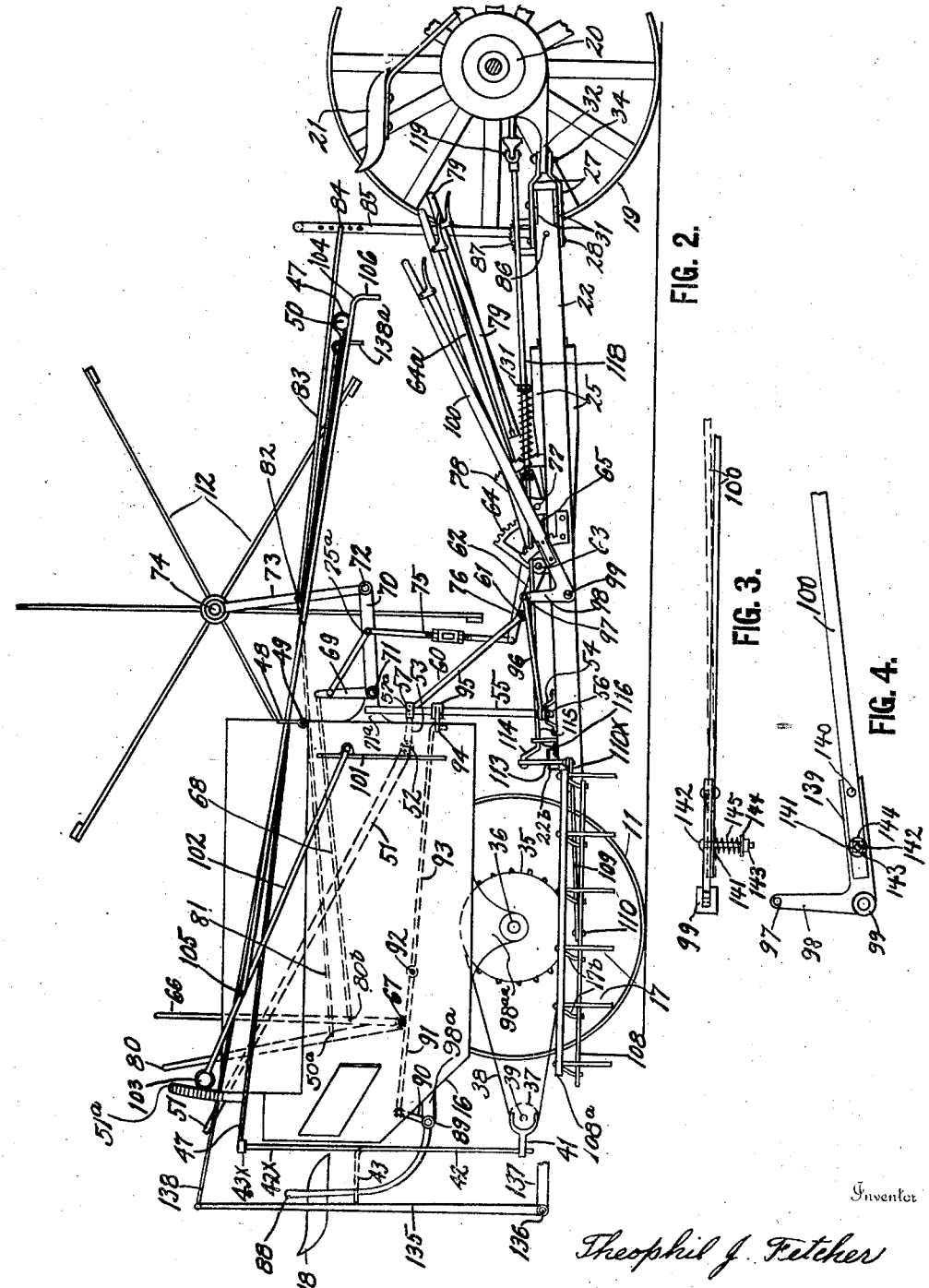

March 22, 1927.
T. J. FETCHER
1,621,773
CONTROLLING DEVICE FOR MOTOR DRAWN BINDERS
Filed July 29, 1921
3 Sheets-Sheet 3
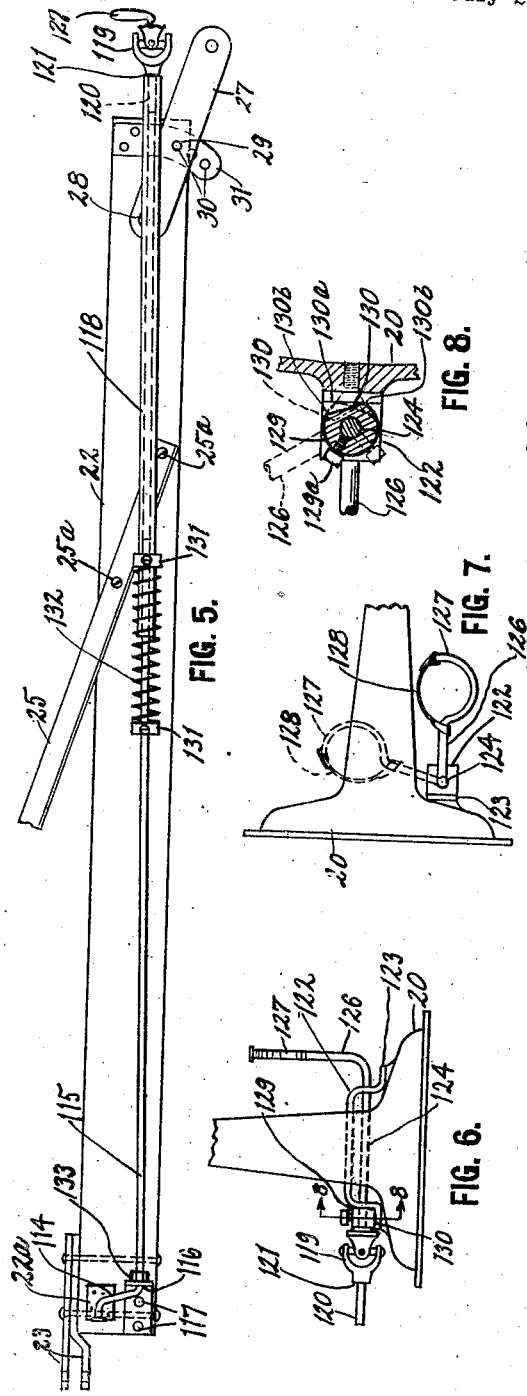
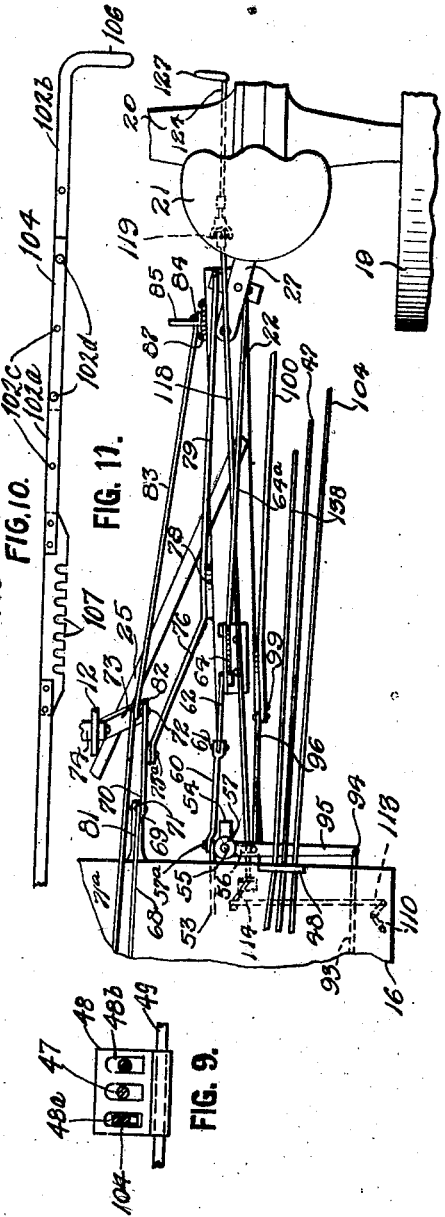
Inventor
Theophil J. Fetcher
By A. M. Carlsen
Attorney Patented Mar. 22, 1927.

1,621,773

UNITED STATES PATENT OFFICE.

THEOPHIL J. FETCHER, OF NORWALK, WISCONSIN.

CONTROLLING DEVICE FOR MOTOR-DRAWN BINDERS.

Application filed July 29, 1921. Serial No. 488,341.

My invention relates to harvesting machinery, particularly a device enabling farmers and manufacturers to build or convert horse drawn binders into tractor drawn binders controlled and manipulated by the operator of the tractor while sitting on the tractor seat.

The object is to provide an efficient device of such construction that all manipulations usually done from the binder seat are done from the tractor driver's seat, eliminating the need of a man on the binder. Another advantage is that the tractor is readily disconnected from the binder and can be driven daily from the field for fuel and water or used for other purposes. A further advantage is that the tractor driver not only has full control of the harvesting machine but occupies his usual place on the tractor assuring perfect control of the latter.

My device therefore is not only a labor saver but also a time saver, both of vital importance during harvesting season.

In the accompanying drawing:

Fig. 1 is a partly diagrammatic top view of my device as attached to a binder and tractor, with some parts omitted or reserved for Fig. 11.

Fig. 2 is a right side elevation of Fig. 1 in general but with some parts omitted and a bar 17 added.

Fig. 3 is an enlarged top view of one of the manipulating levers.

Fig. 4 is a side view of Fig. 3.

Fig. 5 is an enlarged detail top view of the binder tongue used in my device, the lever mechanisms being omitted.

Fig. 6 is a top view of a portion of a tractor with the bundle-carrier operating mechanism of my device attached.

Fig. 7 is an elevation looking as from right to left in Fig. 6.

Fig. 8 is an enlarged detail view as on line 8—8 of Fig. 6.

Fig. 9 is an enlarged front view of bearing plate 48 in Figs. 1 and 2.

Fig. 10 is an enlarged fragmentary detail side view of one of the operating levers on my device.

Fig. 11 is a portion of Fig. 1 showing also some elements omitted or incompletely shown in Fig. 1. Fig. 12 is a section on the line 12—12 in Fig. 1.

Referring to the drawing by reference numerals, 11 is the bull wheel, 12 the reel, 13 the cutter bar, 14 the platform, 15 the elevating frame, 16 the binder deck, 17 the bundle carrier and 18 the driver's seat in approximately the relative size and location to one another of a horse drawn binder.

To the right in Figs. 1 and 2 I have shown the rear portion of a tractor in which 19 are the drive wheels, 20 the axle housing and 21 the driver's seat, the tractor being shown in position for drawing the binder and connected with my device.

The main working parts of my device are mounted on a tongue 22 which takes the place of the tongue used on the horse drawn binder, the latter tongue being removed therefrom. Said tongue 22 is pivotally attached to the main frame by a pivot bolt 24 in a fork 23, and a pivot 26 in a slanting brace 25 having its front end bolted to the tongue at 25ª. The front end of the tongue has a swinging clevis 27 pivoted at 28 and adjustable laterally by inserting a pin 29 through an aperture in said clevis and apertures 30 in an upper and lower arm 31 fixed on the tongue. The front end of the clevis arms 27 straddle the draw bar hitch 32 of the tractor and are coupled thereto by a coupling pin 34 (see Fig 2).

The arrangement of control levers and their operation from the driver's seat of a binder varies in different makes but I have endeavored in Figs. 1 and 2 to illustrate in a general way the operation of the various levers affected by my device, which must necessarily be varied accordingly without departing from the scope of the invention.

For a clear description of my device I will describe each operation of the device in successive steps according to the manner in which the grain is handled by the binder, in each step giving the present binder construction and in what manner my device affects it.

Assuming that the binder and tractor are connected by the draw bar or tongue 22 as already described, the operator sitting on the tractor seat 21, the first move is to engage the binder clutch for operating the binder when in motion.

A sprocket 35 keyed on bull wheel shaft 36 drives a small pinion 37 by means of a chain 38 (said pinion being keyed on a shaft 39 on which is slidably keyed a clutch member 40 engaged by a horizontally swinging shifter 41 swung by a vertical shaft 42 having a projecting lever 43 for manipulation by the driver seated on binder seat 18 so that he may cause clutch member 40 to engage a clutch member 45 mounted on shaft 46 which is in alignment with shaft 39 and is directly connected with various working parts (not shown) of the binder.

In my device vertical shaft 42 is extended upwardly as at 42ˣ and a rocker arm 43ˣ provided, the outer end of said arm being pivotally connected to the rear end of a rod 47 extending forwardly through a bearing plate 48 mounted on a permanent element 49 of the binder (see Figs. 1, 2 and 9) the forward end of the rod terminating in a hand hold 50 back of the tractor seat 21 within reach of the operator, who may thus operate clutch 40—45 from seat 21.

Secondly. The operator may desire to adjust the height of the cutter knives 13 before starting, or he may do so at any time during the grain cutting process as follows: On most binders the tilting for adjusting the height of the cutters is accomplished by using the axle 36 as the tilting point or line, and a tilting lever 51, fulcrumed by a rockshaft 52 having an arm 53 connected to the tongue 22 by a vertical link (not shown, because in my device it is replaced by a vertical bar or rock-shaft 55). The lever 51 may be held in variously raised positions by a rack 51ᵃ. The result being that raising and lowering of the lever 51 causes the rockshaft or fulcrum 52 to raise and lower the cutter bar 13.

In my device the above described mechanism is so changed that the new bar, 55, is loosely journaled and retained with its lower end in an upwardly arched bracket 54 while the upper end is slidably journaled in a collar 57, which by a pivot screw 57ᵃ is pivoted to the arm 53 (now rigidly held by the lever 51 and its locking rack 51ᵃ) and is also by the same screw pivoted to the upward end of a link-rod 60, having its lower end pivoted at 61 to the shorter arm 62 of a hand-lever 64ᵃ, fulcrumed by a shaft 63 near a toothed sector 64 which may engage and hold the lever in the usual manner of such levers. Said lever being operable from the seat 21 on the tractor, for raising and lowering the cutter bar end of the harvester frame.

The bar or rock-shaft 55 also has two fixed rocker arms, 56 and 95, in Figs. 1 and 2, the use of which will presently be described.

Third. The operator may wish to shift the reel 12 horizontally or vertically according to the height of the grain being cut. In the usual way this is done from the binder seat approximately as follows, (see Figures 1 and 2): A lever 66 fulcrumed at 67 controls the height of the reel by means of a rod 68, the forward end of which is pivotally connected to the upper end of a vertical arm 69 of an L-shaped lever 69—70, fulcrumed at 71 to a projection 71ᵃ of the well-known framework supporting the binder deck 16; the outer end of arm 70 of the lever is connected at 72 to the lower end of a normally vertical reel support 73, the upper end of which forms a bearing 74 for the reel 12; (see also Fig. 11).

By manipulating lever 66, the lever 69, 70 raises and lowers arm 73 and consequently the reel. With my device the connection rod 68 is disconnected from arm 69 and a vertical rod 75 substituted (see Fig. 2); the upper end of said rod 75 is pivotally connected at 75ᵃ to the horizontal arm 70, the lower end of said rod 75 being pivotally connected at 75ᵇ to the rear arm 76 of a lever 79 pivoted on a shaft 77 in a toothed sector 78 secured to the tongue 22; said lever 79 terminating near the tractor seat 21. Manipulation of the latter lever raises and lowers the reel.

The horizontal adjustment of the reel from the binder seat is accomplished by a lever 80 fulcrumed about as at 67 and a forwardly extending connecting rod 81, having its rear end pivotally engaging said lever at 80ᵃ and its front end pivotally secured at 82 to the reel support 73. With my device rod 81 is disconnected at 82 and another connecting rod 83 substituted, the latter extending forwardly and pivotally engaging as at 84 a normally vertical hand-lever 85, pivotally attached at 86 to the tongue 22 near the front end thereof. A toothed segment 87 and an operative connection (not shown) therewith from the lever 85 permits horizontal adjustment of the reel.

Fourth. On all binders the socalled binder-deck 16, on which the twine is tied around the grain bundles, is movable in longitudinal direction of the bundles, so that it may be adjusted to hold either long or short grain bundles in proper relation to the binding device. Such movement of the binder deck is in ordinary operation accomplished by a hand lever 88 near the driver's seat 18; said lever being pivoted at 89 (see Fig. 2), to some stationary element as 89ᵃ of the binder frame. The lever has an arm 90 the end of which is pivotally connected to the rear end of a connecting rod 91, the front end of which is pivotally connected as at 92, to the movable binder deck. In my device the rod 91 is disconnected at 92 and the rear end of a forwardly projecting rod 93 substituted, the front end of which rod is pivotally connected at 94 to the outer end of the rocker arm 95 (see Figs. 1 and 11), while the lower arm 56 is pivotally connected to the rear end of a connecting rod 96 the front end of which is pivotally at 97 (see Fig. 2) to the short arm 98 of a lever 100 fulcrumed at 99 on the side of the tongue 22 and terminating near the tractor seat 21, and within reach of an operator on said seat. Manipulation of the lever 100 up or down regulates the position of the binder deck through action of the lever 98, rod 96 turning of shaft 55, the lateral swinging of arm 95 and consequent push or pull on rod 93 connected with the binder deck at 92.

Fifth. All binders have a butting board 101 near the front end of the binder deck for the purpose of making the butt ends of the bundles as nearly even as possible. Said board is usually adjustable laterally by means of a reach rod 102 the rear end of which, as 103, is within reach of the man on the binder seat 18, and the front end is connected to side board 101, only a slight push or pull being necessary to adjust the position of said board.

With my device a special reach rod 104 is pivotally connected as at 105 at a suitable point on reach rod 102, projecting forward therefrom through a stationary bracket (provided on binders but not shown in the drawing, and forward of said bracket said rod 104 projects through a slot 48ª in bearing plate 48 (Figs. 1, 2, 9 and 11) and the forward end forms a handle 106 within reach of the driver on the tractor seat. (See Fig. 10.) Said rod 104 is provided with notches 107 on its under side to engage plate 48 at bottom of slot 48ª thus providing for fixed position of butting board 101. The reach rod may also be made of overlapping sections 102ª, 102ᵇ with registering apertures 102ᶜ for screws 102ᵈ permitting extension of said bar at will (see Fig. 10).

Sixth. The machine has a bundle carrier adapted to drop the bundles on the ground. Said carrier is composed of a series of parallel arms 17 and a bar 108 receiving motion from a rod 109, connected to said bar at 110. The front end of said rod 109 is pivotally connected to a bell crank lever 110ˣ operated by a foot lever 111 near the operator's seat, rod 112 and any suitable intermediate connections (not shown) between said rod 112 and the bell crank.

In my device the bell crank is disconnected from the above mentioned intermediate connections and a transverse connecting rod 113 is pivotally connected with one end of bell crank lever 110ˣ, its other end being pivotally connected to the outer end of a crank arm 114 of a shaft 115 journaled near said crank in a bearing 116 secured as at 117 on the rear end of tongue 22. Said shaft extends forward toward the front end of the tongue and is spaced above same, the front end of the shaft being slidably engaged with and inserted into a pipe 118 extending forward toward the tractor. A universal joint 119 has a stub shaft 120 extending back from a shoulder 121, said shaft being inserted in the front end of pipe 118 (Figs. 1, 2 and 5) and slidably engaging same by means of a feather key (not shown) or otherwise.

The universal joint is a part of a driving mechanism attached to the tractor for operating the bundle carrier as follows:

I provide a bracket 122 with bolting lugs 123 for securing it to any stationary part of the tractor (shown as the rear axle housing 20 in Figs. 1, 6, 7, 8 and 11). A shaft 124 which may be a part of the forward portion of the universal joint extends forward through said bracket and is journaled in same. The forward end of the shaft is bent out to form a lever arm 126 the extremity of which is bent to form a loop member 127 adapted to be closed by another loop member 128, the two members forming a stirrup into which the operator can insert his foot (see Figs. 6 and 7). It being clearly shown in Figs. 1 and 12 that the bundle carrier has tines 17 pivoted to swing horizontally in a frame bar 108ª, as from a transverse position 17ª when the bar 17 to a slanting position 17ª the rear arms 17ᵇ of the tines, 108, pivoted to the rear arms 17ᵇ of the tines, is pulled or pushed by the rod 109, bell crank lever 110ˣ, rod 113 and crank 114, it follows that in operation the stirrup 127 may normally stand up as in dotted line in Fig. 7 while the bundles B accumulates, and then by pressing downward in the stirrup the crank 114 will turn and stop against the block 22ª (in Fig. 5) while the tines 17 swing to a slanting position and let the bundles drop, whereupon the stirrup and by it the tines are quickly restored to normal position. Of course it is a matter of choice whether to let the tines swing from their transverse position either backward or forward, and in the description of Fig. 8 it is made clear that means are provided for stopping the movement of the tines in either direction, for holding and for dropping the bundles. Secured on the shaft 124 by a set-screw 129ª (see Figs. 6, 7 and 8) is a collar 129 having at one side a flat face 130, the lateral ends of which form two corners 130ᵇ, which act alternately as stops against a surface 130ª of a bracket 122, to limit the swinging of the lever 126.

On both the pipe 118 and shaft 115 I provide adjustable collars 131 (Fig. 5) with a compression coil spring 132 between them and tending to push them apart. A collar 133 fixed on shaft 115 close to bearing 116 prevents said shaft from sliding rearwardly and therefore the action of spring 132 is forward, keeping pipe 118 in contact with universal joint 119 and its shoulder 121.

The bundle carrier operating mechanism of my device, it will be noted, is the only part secured to the tractor proper, but it will be readily seen that when the tractor is disconnected from the binder by taking out draw pin 34 (Fig. 2) it is merely necessary to run the tractor ahead and universal joint stub shaft 120 slips out of pipe 118. Said shaft 120 being short will not drag on the ground and does not interfere with any other operation for which the tractor may be used.

When bundles are accumulating on the carrier the rear end of crank 114 rests on block 22ª and is lower than shaft 115 and rod 113 extends downwardly at an angle to lever 110ˣ. Thus the weight of bundles tends to keep crank 114 down and at same time hold the lower corner 130ᵇ of collar 129 (see Fig. 8) against face 130ª of bracket 122, thus steadying the bundle carrier operating mechanism and practically locking same during accumulating of bundles on the carrier.

In Figs. 3 and 4 I have shown a flexible construction of lever 100 controlling the binder shifting mechanism although it can be used also in other places in the machine. The lever 100 is a flat metal bar the rear end of which fits snugly into the channel shaped portion 139 of lever 98. It is riveted loosely at 140 and provided with an aperture at 141 registering with a similar aperture in the casting for inserting a bolt 142 having a nut 143 and washer 144, and a compression spring 145 is inserted between said washer and the bar 100. When a tractor with extra large drive wheels is used it is possible that during a turning movement of same the fender of one wheel may contact with lever 100 and when this occurs the lever will yield (see dotted line in Fig. 3) and will fulcrum on rivet 140 its rear end pressing out against pressure of spring 145. This construction makes a comparatively rigid yet a laterally yielding lever.

The operation of my invention being already fully disclosed in connection with the description of each sub-mechanism thereof I will not further describe the operation.

What I claim is:

1. In a controlling device between a tractor having a seat for an operator and a grain binder drawn by the tractor and having carrier with horizontally swingable tines supporting the bundles, a shaft having a crank operatively connected with the tines to swing them, the front end of said shaft having a lateral arm of stirrup shape near the seat, and the portion of the shaft near the stirrup forming a journaled stub shaft connected by a universal joint to the rest of the shaft.

2. The structure specified in claim 1, and means for automatically stopping the swinging of the tines in active and in idle positions.

3. In a draft and regulating mechanism between a tractor and grain harvester, a tongue used as a draft-pole, and mounted on said tongue a hand lever operable from a seat on the tractor, a vertically disposed shaft loosely journaled upon the rear portion of the tongue, a slidable collar serving as a bearing near the upper end of the shaft, a link rod connecting said collar with the said hand lever, and a rigid arm of the binder frame also pivoted to said collar, said arm being the front end of an operating lever ordinarily operated from the rear of the binder but locked in idle position when the lever operated from the tractor is in use.

4. The structure specified in claim 3, in which said vertical shaft has two rigid arms, a rod connecting one of the arms with the binder deck of the harvester to move it, and the other arm having a rod and a lever operable from the seat on the tractor.

5. A structure of the kind described in which the regulating means for raising and lowering the reel of the harvester consists of an L-shaped lever fulcrumed at its angle in a bracket fixed on the binder, operative connection between a horizontally disposed arm of said lever and the support of the reel, a hand lever operable from the seat of the tractor and having operative connection with the horizontal arm of the L-shaped lever; and means extending from the vertical arm of the L-shaped lever to the rear end of the harvester, to enable an operator to act from the seat of the harvester when so desired.

In testimony whereof I affix my signature.

THEOPHIL J. FETCHER.